US012270767B2

(12) United States Patent
Hurni et al.

(10) Patent No.: US 12,270,767 B2
(45) Date of Patent: Apr. 8, 2025

(54) METHOD AND DEVICE FOR OPTICALLY TESTING HOLLOW BODIES

(71) Applicant: Finatec Holding AG, Brügg b. Biel (CH)

(72) Inventors: Michel Hurni, Biel/Bienne (CH); Pascal Choquard, Brügg b. Biel (CH); Beat Schlup, Biberist (CH); Hansjörg Klock, Worb (CH)

(73) Assignee: Finatec Holding AG, Brügg b. Biel (CH)

( * ) Notice: Subject to any disclaimer, the term of this patent is extended or adjusted under 35 U.S.C. 154(b) by 29 days.

(21) Appl. No.: 17/628,074

(22) PCT Filed: Aug. 3, 2020

(86) PCT No.: PCT/EP2020/071801
§ 371 (c)(1),
(2) Date: Jan. 18, 2022

(87) PCT Pub. No.: WO2021/023706
PCT Pub. Date: Feb. 11, 2021

(65) Prior Publication Data
US 2022/0260502 A1    Aug. 18, 2022

(30) Foreign Application Priority Data
Aug. 2, 2019    (CH) .................................. 980/19

(51) Int. Cl.
*G01N 21/90*    (2006.01)
*G01N 21/3563*    (2014.01)
(Continued)

(52) U.S. Cl.
CPC ......... *G01N 21/90* (2013.01); *G01N 21/3563* (2013.01); *H04N 23/74* (2023.01); *H04N 23/90* (2023.01)

(58) Field of Classification Search
CPC ......... G06T 2207/20084; G06T 7/0002; G06T 7/0004; G06T 2207/10024;
(Continued)

(56) References Cited

U.S. PATENT DOCUMENTS 5,045,688 A * 9/1991 Domenico ......... G01N 21/9054
250/223 B
5,136,157 A * 8/1992 Apter ...................... G01N 21/90
250/223 B
(Continued)

FOREIGN PATENT DOCUMENTS

DE    102012100987 B3    7/2013
DE    102017201776 A1    8/2018
(Continued)

OTHER PUBLICATIONS

International Search Report and Written Opinion for PCT/EP2020/071801 dated Oct. 6, 2020, 5 pages.

*Primary Examiner* — Masum Billah
(74) *Attorney, Agent, or Firm* — Praedcere Law

(57) ABSTRACT

The invention relates to a method for optically testing containers, in which a container (10) is conveyed by means of a transport device (30), whereby an image of a side wall surface of the container (10) is generated by means of an inspection unit (40) comprising a camera unit (20) and an illumination unit (34). An inspection volume (24) is spanned by several correspondingly arranged inspection units (40), in which an image of the entire side wall surface (26) of the container (10) is generated in a transmitted light method, an incident light method and/or a dark-field method.

21 Claims, 5 Drawing Sheets

(51) Int. Cl.
*H04N 23/74* (2023.01)
*H04N 23/90* (2023.01)

(58) Field of Classification Search
CPC . G06T 2207/10028; G06T 2207/20081; G06T 2207/30141; G06T 2207/30148; B29C 2949/0715; B29C 49/06; B29C 49/78; B29C 2049/78675; B29C 2049/787; B29C 2795/002; B29C 49/783; B29C 49/786; B29C 2049/7874; A61M 1/81; A61M 1/912; A61M 1/815; A61M 1/67; A61M 1/98; A61M 1/86; A61M 1/984; A61M 1/918; A61M 1/96; A61M 1/962; A61M 1/882
USPC .......................................................... 348/92
See application file for complete search history.

(56) References Cited

U.S. PATENT DOCUMENTS

| | | | | |
|---|---|---|---|---|
| 5,175,428 | A | * | 12/1992 | Agerskov .......... G01N 21/9054 250/223 B |
| 2011/0050884 | A1 | * | 3/2011 | Niedermeier ...... G01N 21/9036 382/142 |
| 2014/0015960 | A1 | | 1/2014 | Neidermeier |
| 2018/0157941 | A1 | * | 6/2018 | Kobayashi ......... H04N 1/00594 |
| 2018/0195974 | A1 | | 7/2018 | Kress et al. |
| 2019/0168434 | A1 | | 6/2019 | Kubalek et al. |
| 2020/0005070 | A1 | * | 1/2020 | Ambikapathi ...... G06F 18/2413 |

FOREIGN PATENT DOCUMENTS

| | | |
|---|---|---|
| EP | 1779096 A2 | 5/2007 |
| EP | 2290355 A2 | 3/2011 |

\* cited by examiner

METHOD AND DEVICE FOR OPTICALLY TESTING HOLLOW BODIES

TECHNICAL FIELD

The present invention relates to a method and a device for optically testing hollow bodies, in particular containers such as bottles or canisters, but also technical objects such as container closures and/or preforms for the production of containers. In particular, this invention relates to a method and a device for the optical testing of containers which are suitable as packaging articles for holding liquids, pastes, creams and/or piece goods, e.g. tablets, dragées, etc. A hollow body to be tested is conveyed along a test section by means of a transport device. The hollow bodies can thereby vary in size, shape, color, transparency and/or material and can be more or less printed and/or structured.

STATE OF THE ART

In the beverage industry, containers are increasingly being used in the form of disposable plastic bottles, which are also used in the chemical, pharmaceutical and cosmetics sectors for hygienic, logistical and cost reasons. Corresponding plastic containers are therefore needed and used in large quantities.

In general, the production of appropriate containers involves a two-stage method, whereby a preform is first produced and then expanded to its full size in a blow-stretch process, an extrusion blow molding process or another suitable method.

In industrial manufacturing, non-destructive testing of the preforms and/or containers is well known, whereby each individual test specimen is subjected to a control, and, from the control, also corrections of the manufacturing process of the preforms or containers can be initiated. Accordingly, the contour, the bottom and the mouth area of the containers are inspected not only with regard to dimensions, but also for slugs, i.e. material edges, contamination, material inclusions, holes and thin parts, etc., in order to meet the high quality requirements. The test specimens are in particular plastic containers made of PET, PE, HD-PE and/or PP with uniform and/or structured areas and transparent and/or opaque, which are to be subjected to quality control in sorted or unsorted form.

In known optical inspection methods, a transport device is typically used to transport the specimens through a complex inspection system comprising one or more appropriately positioned cameras and adapted illumination means as well as special image processing units. The cameras take static or dynamic images of the containers to be inspected, which are evaluated in the image processor using special inspection algorithms to detect defects on the containers to be inspected based on the delivered images and predefined quality standards. In addition to testing to the fullest extent, testing speed also plays an extremely important role in providing an effective method.

The hollow container bodies to be tested are three-dimensional objects often with different shapes and surface appearances, comprising an entire side wall surface as well as a lower bottom and an upper neck or mouth area. For a complete inspection of the container to be inspected, an evaluation of all inspection zones based on images of all imaging areas is required. For this purpose, it is known to move the specimen relative to at least one camera, e.g. to rotate it, or to use several cameras from different viewing directions with an overlapping field of view. The inspection of all inspection zones on a container requires a correspondingly large number of exposures and is correspondingly time-consuming.

A method for optically testing hollow bodies must take into account whether the hollow body to be tested is at least partially light-transmissive, i.e. translucent or respectively transparent, or impervious to light, i.e. opaque, so that in general a sorting prior to the optical test is necessary. In order to inspect opaque and transparent hollow bodies on one system, several cameras arranged in series are furthermore required, making such a system correspondingly cost-intensive and complex.

SUMMARY OF INVENTION

It is the object of the present invention to propose a new method and a new device for optically testing hollow bodies which method and device do not have the disadvantages of the prior art. In particular, it is an object of the present invention to propose a new method and a new device for optically testing hollow bodies, allowing a fast, precise, efficient and reliable, as well as flexible testing of the entire hollow body. The characteristics of the hollow bodies to be tested can thereby vary in many ways. In particular, the method and the device should ensure flexibility in terms of easy and fast switching between testing in incident light and/or transmitted light.

These objects are achieved according to the invention through the features of the independent claims. Further advantageous embodiments follow moreover from the dependent claims and the description.

In particular these objects of the invention are achieved through a method for optically testing hollow bodies, in which a hollow body is conveyed by means of a transport device, in particular along a transport direction, at a transport speed, whereby an image of a side wall surface of the hollow body, as well as of a bottom region and mouth region, is generated by means of an inspection unit comprising a camera unit and an illumination unit. It is envisaged that several inspection units are arranged so that an inspection volume is able to be spanned in which an image of the entire side wall surface of the hollow body is generated in a transmitted light method, an incident light method and/or a dark light <sic. dark field> method.

By means of the transport device, the hollow body is conveyed, in particular moved past one or more inspection units, so that there is a relative movement between the test specimen and the respective inspection unit. In one embodiment, the relative movement is also achieved when the respective inspection unit moves or is moved relative to the test specimen and/or the test specimen moves or is moved.

Optical testing of the hollow body can be performed after production or after cleaning of a recyclable hollow body. It is thereby envisaged that the method for optical testing is a transmitted light method, dark field method and/or incident light method.

The test specimens can be cylindrical and non-cylindrical hollow bodies with an opening and an opposite bottom surface, but also cans and/or tubes, especially made of plastic, e.g. PET, PE, HD-PE or PP or a biodegradable material. Such containers are designed to hold beverages and/or food, hygiene articles, pastes, medicines, or chemical, biological and/or pharmaceutical products. Consequently, parts, cavities, bottles, vessels or vessel accommodations are also considered to be containers. Also within the scope of the invention are container closures and preforms for the manufacture of containers.

In accordance with the invention, a plurality of inspection units are provided for the generation of suitable image information for the complete inspection of the hollow body to be inspected, whereby an inspection unit in one embodiment comprises at least one camera unit, an illumination unit and according to one embodiment filter elements. The camera unit can generally be any device or respectively sensor for capturing an image, whereby the field of view of the camera unit is directed parallel to a longitudinal axis of the hollow body, which is at least temporarily located in the inspection volume defined by the inspection unit or units.

The camera unit, which can also be referred to as an image recording device, can be designed as a matrix camera with CCD sensor, an APS or CMOS camera, an infrared camera as an area scan camera. It is also conceivable that the camera unit comprises a line of phototransistors or respectively light-sensitive elements. Preferably, the camera unit is designed as a line scan camera, which is particularly suitable for imaging round bodies without perspective distortion. In one embodiment, the line scan camera unit is oriented such that the longitudinal axis of the line scan camera is parallel to the longitudinal axis of the hollow body. The width of the sensor or sensors of the line scan camera can be at least equal to the length of the hollow body. Alternatively, a "full" two-dimensional image can be obtained by moving the camera unit or by zooming.

The camera unit is configured to detect light, preferably of selected wavelength ranges, and to create line-wise or column-wise images. A line scan camera with multiple lines or columns can be used to achieve a high frame rate. Due to a defined observation area accessible to the line scan camera in connection with the hollow body to be inspected, the camera has a high spatial resolution. In the case of an object moved past the multiple inspection units, the respective line scan camera or a line scan camera system captures a sequence of line-shaped or column-shaped images of the hollow body in the inspection volume, which are dynamically combined in an associated processing unit or processor and synchronized with the movement of the object to be inspected. Based on the image information obtained, an analysis of the entire side wall surface of the hollow body under inspection can be derived. The image information or respectively the electronic image files can, for example, be compared with stored reference files.

Besides a camera unit, an inspection unit comprises a suitable illumination unit. Basically, a suitable illumination unit is one that emits any light with any wavelength and/or any spectral range. Accordingly, dynamic and/or static illumination units are conceivable.

Preferably, the illumination unit only emits light in a spectral range able to be predetermined or adjusted. For this purpose, the illumination unit can comprise one or more illuminants to emit light point-like or preferably extended in one or two spatial directions. Especially preferred in connection with the use of a line scan camera is an illumination unit designed to illuminate a strip in the vertical direction, i.e. suitable to generate a thin high-frequency light line of high brightness, i.e. to emit light in the form of a light strip matched to the line scan camera and corresponding to the length of the hollow body parallel to the longitudinal axis of the hollow body.

In order to enable the most variable optical testing of hollow bodies, the use of filter elements and/or lens elements in the single inspection unit is foreseen. Alternatively, the camera unit and illumination unit can be matched to each other according to the light spectra used, including the entire visible range.

In one embodiment, a filter element can be arranged in an inspection unit, which is configured as a collimator, for example, in order to align light beams emitted by the illumination unit parallel to one another at least in one spatial direction, whereby all light rays not running at a predetermined angle are absorbed.

Preferably the filter element is a polarizing filter. Accordingly, in one embodiment, a polarizing filter disposed in the path of the outgoing light is arranged to be transmissive only to radiation transmitted in the corresponding direction and to eliminate gloss effects affecting the measurement value acquisition. Preferably, the polarizing filter is located between the hollow body to be inspected and the optical sensor of the camera unit, so that the illumination unit can emit unpolarized light to illuminate the hollow body. In addition, a polarizing filter may be provided between the illumination unit and the hollow body under inspection in the path of the emitted light. Furthermore, by phase shifting or polarization rotation in the light detected by the sensor of the camera unit by means of the polarizing filter, this can be matched to a defect to be detected. Through the filtering effect of the polarizing filter, only a small portion of the originally emitted light reaches the sensor or sensors of the camera unit, so that it is intended that the illumination unit emits a high amount of light in order to minimize noise. In addition, the use of further filter elements and/or lenses is also conceivable, for example color filters.

For the inspection of a hollow body, in one embodiment of the present invention, the plurality of inspection units are arranged in planes parallel to the transport device in such a way that the optical axes of the respective inspection units are directed at an angle to one another. The optical axes of the inspection units can thereby cross at an angle between 75° and 105°, preferably at an angle of about 90°. Preferably, in one embodiment, two inspection units are arranged parallel to each other and on opposite sides of the transport device, thus providing a total of four inspection units spanning the inspection volume. Accordingly, the optical axes of two inspection units on opposite sides of the transport device lie on one line, or are slightly offset from each other, along the transport direction. Preferably, the hollow body to be inspected passes along the transport direction through the intersection point of the optical axes of the—preferably four—arranged inspection units, which largely coincides with the inspection volume. But another number and arrangement of inspection units is also conceivable, such as, for example, three inspection units, which are disposed in the form of a triangle. The positioning of the inspection units is variable in height, i.e. with regard to the vertical distance to the transport device, in order to be adaptable to different heights of the hollow bodies to be inspected. Furthermore, it can be provided that, for the inspection of a hollow body, the body can be moved in the inspection volume relative to the inspection units, for example that it is not only moved translationally but can also be rotated by suitable means.

The optical inspection method can be applied to a part of the hollow body, for example the neck region, a possible threaded area, the side wall surface and/or the bottom region of a container or preform.

The method according to the invention allows the optical inspection to be carried out in accordance with the translucency of the hollow body. Thus, a hollow body that is at least partially translucent or transparent to one or more spectral wavelengths can be tested using the transmitted light method. In the latter case, by means of the included polarizing filter in combination with the illumination unit, light with an adjustable spectral wavelength can be used. The several inspection units are activated one after the other with high frequency by suitable control means, so that a camera unit of an inspection unit detects the light emitted by the illumination unit of an inspection unit located opposite along the optical axis after passing the hollow body to be inspected. For a comprehensive, e.g. inspection of the entire side surface, i.e. an all-round side inspection, it is envisaged that serial scanning or multiplexing is carried out by the provided inspection units by means of suitable control of the activation, so that an overall image of the hollow body to be inspected can be generated from a large number of individual images. By means of the method according to the invention, a compact design of the device for optical inspection is possible, so that its integration relative to existing components is possible. Furthermore, it avoids that illumination means exert a disturbing influence on the optical testing, which would otherwise require the use of shielding elements. In order to achieve integrated scanning, i.e. inspection, it is necessary that the scanning, i.e. the recording of a large number of individual images, takes place at a speed many times higher than that at which the container to be inspected moves along the transport direction.

If the hollow body is made of an opaque material, the incident light method or reflection mode can be used. For this purpose, the method according to the invention is set up in such a way that the light emitted by an illumination unit of an inspection unit is detected by the camera unit of the same inspection unit or by a correspondingly suitably arranged camera unit after reflection on the surface of the hollow body to be inspected. The camera unit and illumination unit can thereby be positioned and configured relative to each other in such a way that, for example, the line scan camera is at an angle of reflection to the light line emitted by the illumination unit, which, for example, can be focused by means of suitable lens elements and/or reflectors.

In an optical inspection according to a dark field method, the camera unit is positioned relative to the illumination unit in such a way that the light deflected by defects can be detected by the camera unit, so that defects appear brighter in the camera image than the surroundings.

The optical inspection of a hollow body in all-round view of the side wall surface, as well as of the bottom and the mouth area, which can be carried out with the method according to one embodiment of the invention, detects defects, such as holes or pinholes, thin and/or thick wall areas, cracks, scratches, streaks, bubbles and/or non-melted areas, etc.

Thanks to the method according to one embodiment, it is possible to obtain a distortion-free image of the hollow body to be inspected with several inspection units. Comparable to the human eye, an area scan camera records an image with a perspective distortion in the direction of travel, which has a negative effect when evaluated for the detection of defects. In contrast, an image taken by a camera unit designed as a line scan camera corresponds to the straight, horizontal view without distortion. However, the captured images of a line scan camera appear unnatural to the human eye, especially distorted, and lack depth information. To counteract this and to facilitate optical testing, especially of critical areas, simulation of the missing depth information is foreseen by means of software used by image processing, by means of a so-called trapezoidal distortion. This type of processing is limited by the fact that information about the geometry of the hollow body to be tested is not known, or is only partially known, in advance.

In an optical inspection of hollow bodies, which is largely adapted to inspect hollow bodies of one type and/or one color, the method according to an advantageous embodiment has the advantage that the constructive effort can be reduced by a controlled multiplexing of the inspection units. Consequently, an advantage of the multiplexing used in the method according to an advantageous embodiment is that it is not necessary to spatially separate camera units and/or illumination units from each other and to provide corresponding shielding devices when testing opaque objects in the incident light method as well as transparent objects in the transmitted light method. Camera unit and illumination unit combined into one inspection unit achieves a compact design.

With the method according to an advantageous embodiment, several images of the hollow body to be inspected can be generated, whereby the hollow body is moved along the transport direction past the inspection units and whereby a controlled temporal multiplexing is used to switch back and forth between the individual inspection units, or between the individual camera units and/or illumination units, in order to enable a multiple measurement. The multiplex mechanism formed by the camera units and illumination units of the multiplicity of inspection units can be activated at high speed, in particular at a frequency in the kHz range, by means of suitable control. The image information obtained by the method can provide information about general defects of the hollow body, where the position, size and/or type of the defect on the hollow body can be detected.

Optical testing of a hollow body, namely a container, can be performed in the areas of neck, side wall surface and/or bottom to detect any defects or deviations from predefined dimensions, shapes or contours. In the neck area, the diameter, ovality, but also the formation and dimensional accuracy of a thread in a threaded area for mechanical connection to a closure cap must be checked in particular in order to be able to sort out any incorrectly formed containers. In the bottom area, stains and/or inclusions of foreign material and flaws should be detectable. The contour to be inspected, but also detected holes and/or thin spots on the side wall surface as well as slugs, i.e. material edges which can form on crushed edges during the production of the container, can lead to the container being rejected.

For a complete optical inspection of a hollow body, the method and the device according to the invention can be extended individually, whereby inspection units of the same type or of different types can be added as desired and required. One of the parts of a container to be inspected is e.g. the neck area, which is to be inspected in particular with regard to inner diameter, ovality, cracks, inclusions, material accumulations in the inner diameter and/or the width of the sealing surface. For this purpose, a further inspection unit can be arranged parallel to the longitudinal axis of the container, in particular above the transport device, so that the arrangement of camera unit and illumination unit is set up to generate an image of the neck area for further evaluation.

Furthermore, for the inspection of a threaded area of a container, further inspection units can be provided, which allow an inspection of the inside and the outside of the threaded area. In one embodiment of the invention, two or more inspection units, or their camera units, are arranged in such a way that the images generated thereby convey image information of parameters to be inspected. These parameters of a threaded area are, for example, a roll-on outside diameter, an ovality, an overall height, a depth, a width and/or a slope of surfaces. For thread and/or diameter measurement, telecentric illumination and/or telecentric optics are preferably used on the object side, which reduces imaging errors and allows comparison of sizes of different ranges or areas. In other words, the image scale in the depth of the image field does not change as a result of the telecentricity used.

In addition to checking the side wall surface, a further optical testing also involves checking the contour of the hollow body to be inspected whereby this is to be checked for any existing slugs and/or thin spots. Slugs, which are also referred to as burrs or sprues, are formed during certain manufacturing processes of hollow bodies, e.g. plastic containers, especially in areas of the bottle or container neck, at the bottom and at the seam between the mold halves used for the manufacture. The inspection of containers therefore includes an inspection of the contour for slugs, often realized by means of line scan cameras. Although it is intended that the slugs are sheared off as soon as the mold halves are opened, this is only partially successful, so that reworking and inspection are necessary. Protruding slugs are a criterion for rejection, especially in containers with an integral handle. The inspection can be integrated into the method according to a preferred embodiment, whereby the quality control is carried out by means of optical inspection, preferably by means of backlighting, so that a sharp contrast between slug and contour becomes visible For this purpose, it is foreseen that the illumination unit and camera unit are arranged on opposite sides of the container to be inspected.

An inspection of the bottom area can be foreseen, whereby for this purpose the hollow body to be inspected can be lifted off or picked up from the transport device by correspondingly designed means, e.g. by means of gripping elements, so that an inspection of the bottom surface for foreign material, flaws or thin spots and deformations can be detected by an arranged inspection unit.

A method according to one embodiment of the invention can further be supplemented by performing a quality control of the hollow body to be tested by means of an infrared inspection unit. An infrared inspection unit comprises an IR-capable image recording unit, for example a microbolometer for medium and long wavelength infrared radiation or an IR camera with low exposure time and high wavelength specificity. By using infrared light, properties of a material can be made visible that are different from those detectable in visible light. For example, different plastics show very specific absorption and emission properties as well as reflection patterns when exposed to infrared radiation. For optically testing hollow bodies, but also for checking a preceding manufacturing process and an associated cooling process, an IR inspection unit can be used to provide information about, in particular, hidden inhomogeneity in the material of the hollow body and to draw conclusions about the manufacturing process and the tooling used for it.

Furthermore, also foreseen can be the heating of the test piece by irradiation to detect the more or less targeted heat input and its distribution in the material by means of thermography and to evaluate the generated image data.

It should be mentioned here that besides the described method according to the invention for optical inspection, the present invention also relates to a corresponding device for optically testing hollow bodies.

BRIEF DESCRIPTION OF THE DRAWINGS

Embodiment variants of the present invention will be described in the following with reference to examples. The examples of the embodiments are illustrated by the following enclosed figures.

PREFERRED EMBODIMENTS OF THE INVENTION

In the following detailed description of the preferred embodiments of the invention, only the testing of containers is shown. It should be noted, however, that the present invention also relates, as it were, to the testing of container closures and/or preforms for the manufacture of containers and that the following description is not intended to be construed in a limiting way.

Figure 1:
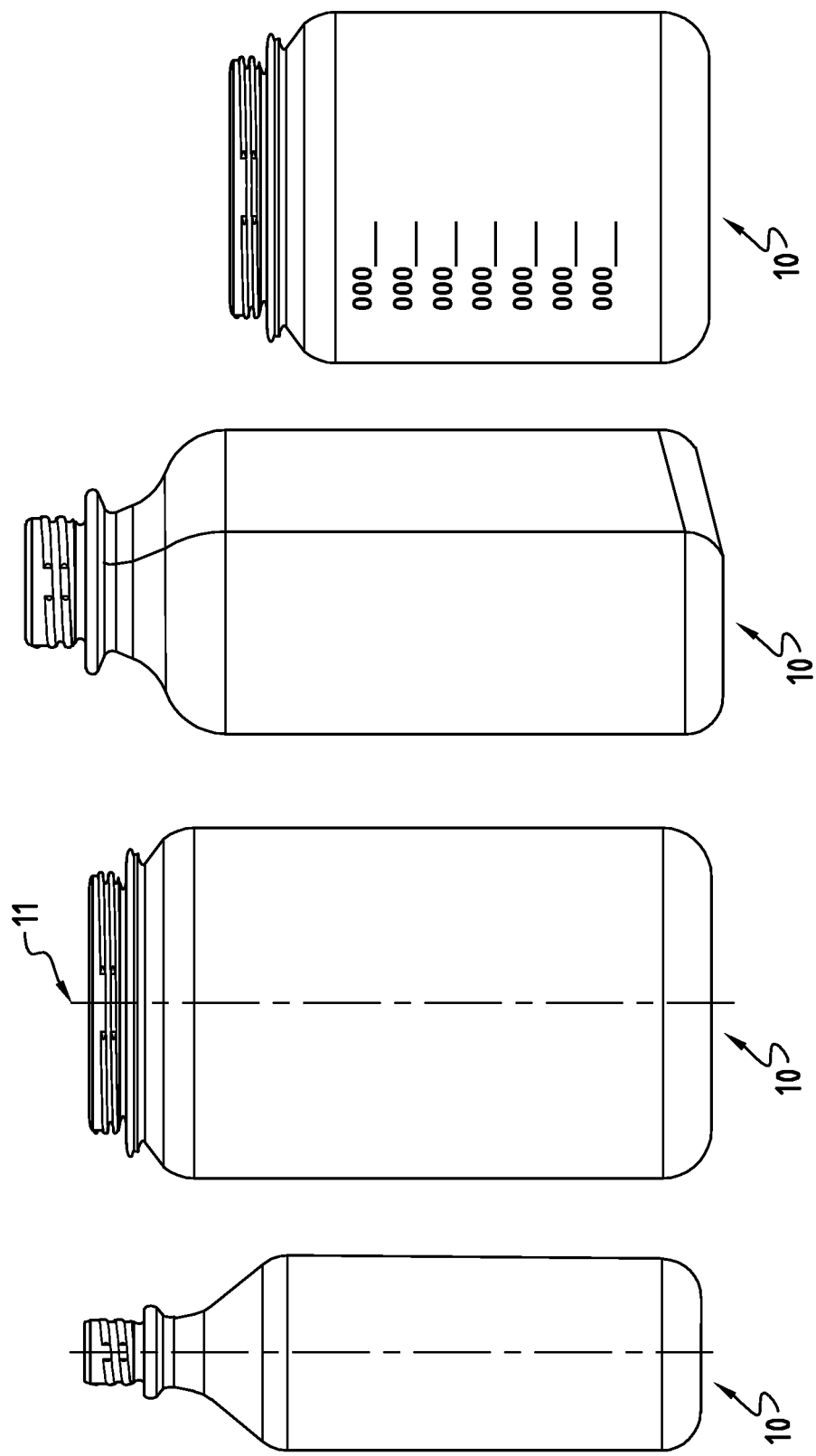
FIG. 1 shows schematically representations of different containers to be tested.

FIG. 1 shows schematically a plurality of containers 10 whose integrity and quality are to be tested in each case by means of the present invention. The containers 10 shown according to FIG. 1 differ not only in size and shape, i.e. whether they have a round, oval and/or angular cross-section, but also in whether they are at least partially made of a transparent or opaque material and whether they may have imprints or labels at least on their side surfaces. A longitudinal axis of the container 10 is designated by 11. Furthermore, the containers 10 to be tested may also include handles, grips, etc., so that their contour may also vary. Now shown in FIG. 1 are containers 10, which can largely also be referred to as bottles. The variety of containers 10 to be tested can also include tubes, cans, canisters or other containers, largely known from the chemical, food, cosmetics, and pharmaceutical sectors.

Figure 2:
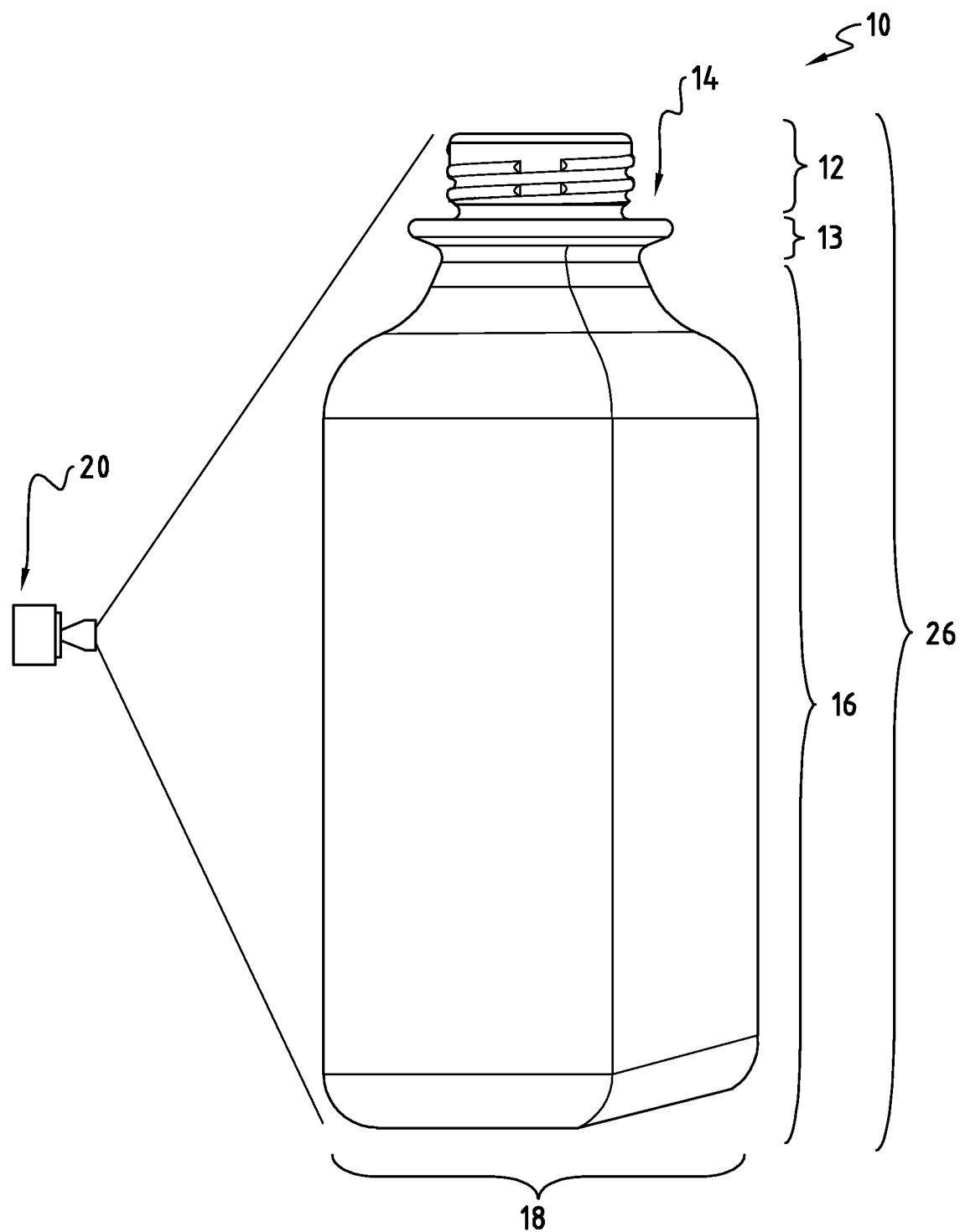
FIG. 2 shows schematically a lateral view of a container to be tested.

FIG. 2 shows on an example of a basic shape of a container 10 to be tested those regions that can be subjected to an inspection. Basically, a container 10 includes a neck region 14 possibly with a threaded region 12, a transition region 13, a body region 16 and a bottom region 18. The inspection method and the inspection device according to the invention are arranged to inspect the container 10, i.e. at least the entire side wall surface 26 of the container 10, as indicated in FIG. 2, by a schematically shown camera unit 20.

Figure 3:
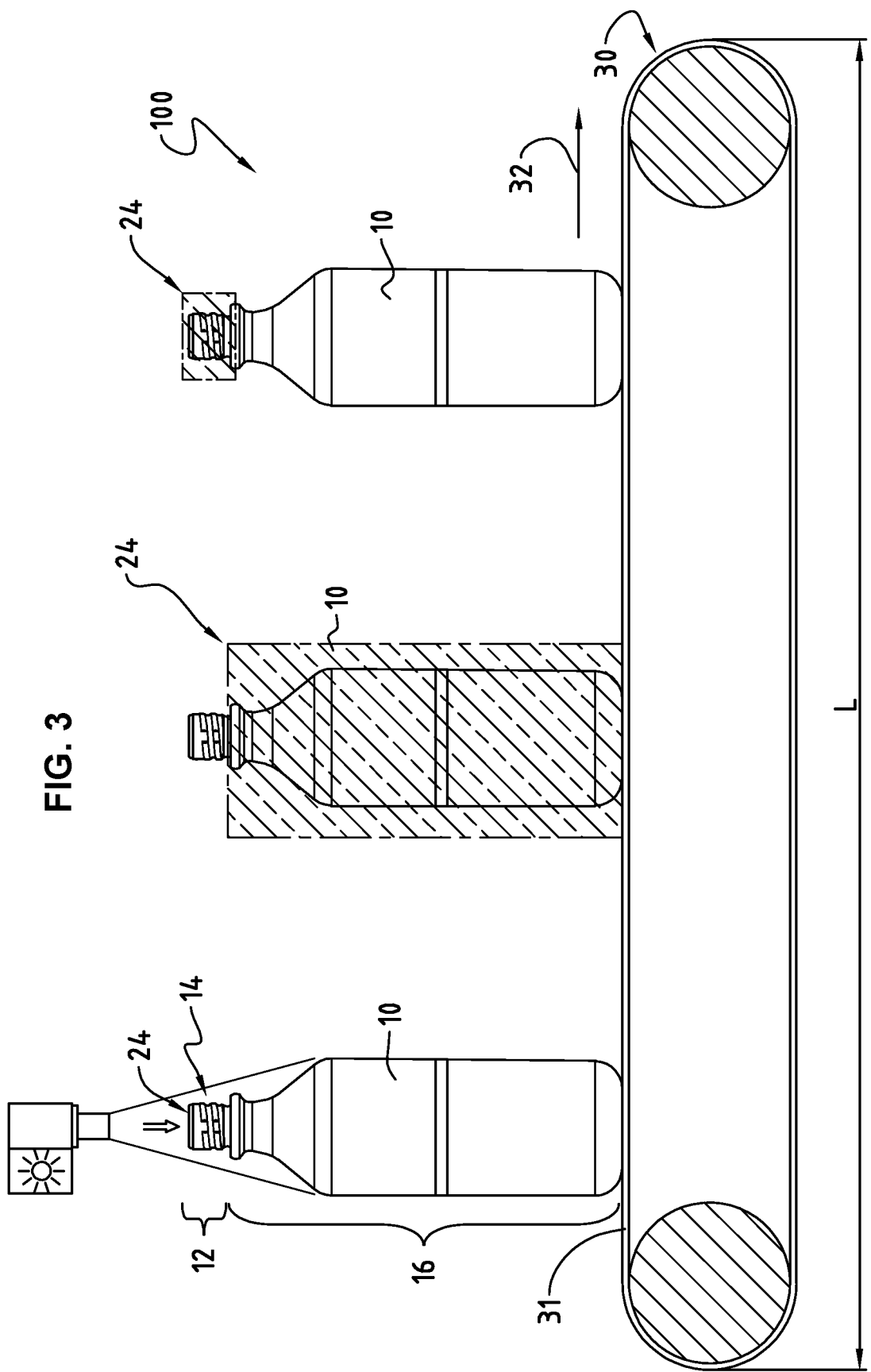
FIG. 3 shows schematically a lateral view of a first preferred embodiment of a device according to the present invention.

FIG. 3 shows a schematic top view of a first embodiment of a device 100 for optical inspection of containers 10 according to the invention, which can be used to realize the method according to a preferred embodiment of the invention. The container 10 to be tested is conveyed into the device 100 by means of a transport device 30, whereby a first movable conveyor belt 31 is provided, the length L of which is selected such that the container 10 can be transported along substantially the entire length of the device 100. The drive means for activating the transport device 30 are only indicated by conveyor rollers and are not described in detail. Likewise not shown in detail are any light barriers to be arranged, which track the transport of the container 10 and are used to trigger certain units, as well as a measuring unit for determining the transport speed of the container 10.

The container 10, which is introduced into the device 100 along the transport direction 32, successively enters inspection volume 24, which is spanned by inspection units 40 to be explained in more detail. Thus, it is shown in FIG. 3 that the container 10 is first subjected to an optical inspection by an inspection unit 40 arranged above the transport device 30 in the correspondingly formed inspection volume 24. An inspection of a mouth formed in the neck area 14 is thereby possible, in particular with regard to ovality, and the interior of the container 10 at least in the neck area 14.

In a further inspection volume 24, spanned in particular by several inspection units 40, which are arranged at the side of the transport device 20 (not shown), the entire side wall surface 24 of the container 10 is preferably subjected to an optical inspection. The method used thereby depends on whether the container 10 is at least partially transparent or opaque, so that there can be variation between a transmitted light method and an incident light method.

In a further inspection volume 24, spanned by correspondingly designed inspection units 40, suitably positioned in relation to the area of the container 10 to be inspected, the threaded area 12 of the container 10 is inspected, in particular with regard to roll-on outside diameter, ovality, overall height, depth, width and/or inclination of surfaces. It is also possible to check whether there are contamination and defects in the threaded area.

Figure 4:
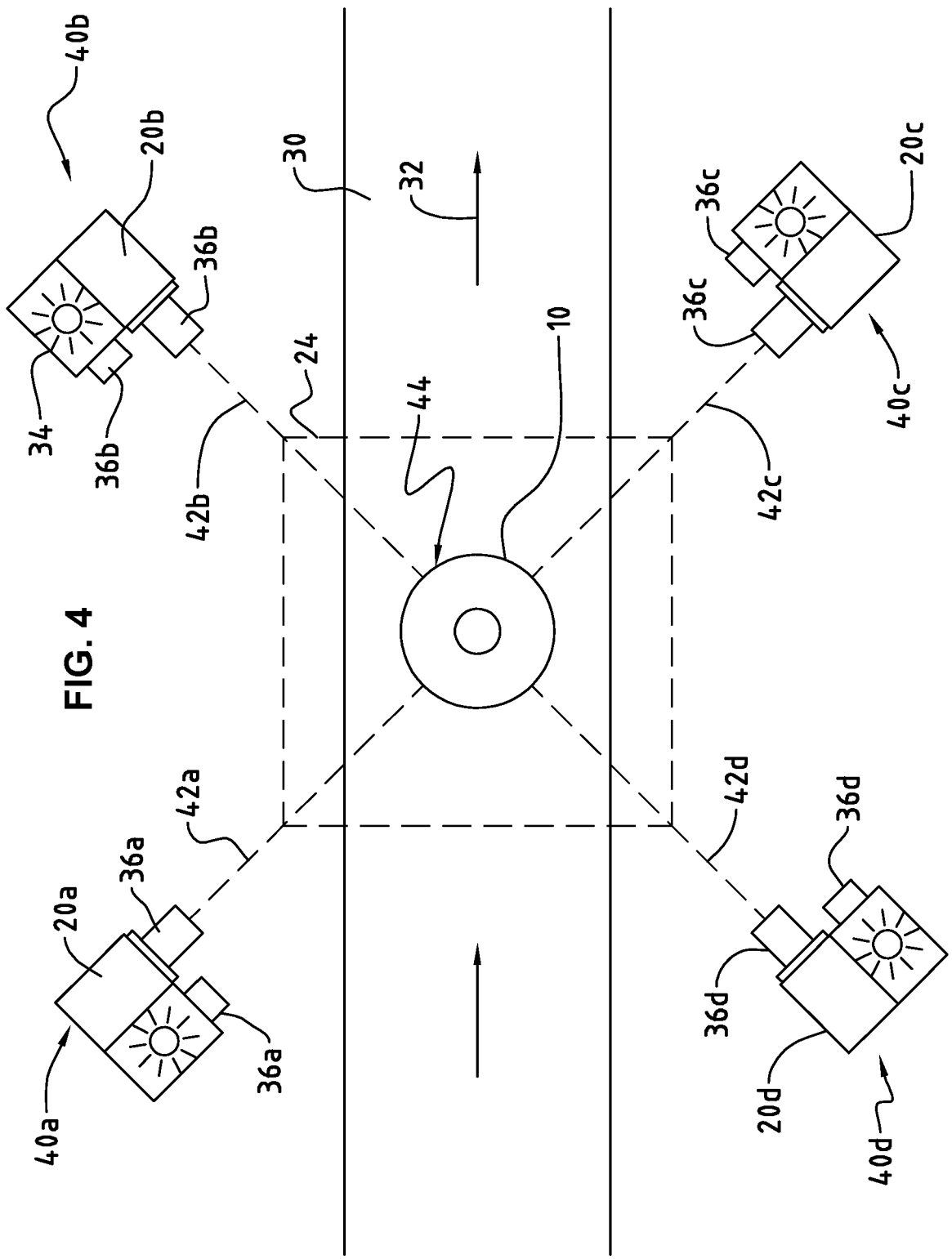
FIG. 4 shows schematically a view of a region of the first preferred embodiment of the invention.

FIG. 4 shows a top view of an area of the device 100 according to FIG. 3. Shown is the area of the device 100 that is set up to inspect the entire side wall surface 26 of the container 10. In the embodiment shown, four inspection units 40a, 40b, 40c, 40d are shown, each comprising a camera unit 20a, 20b, 20c, 20d, an illumination unit 34 or respectively 34a, 34b, 34c, 34d, and filter elements 36 or respectively 36a, 36b, 36c, 36d, which may be arranged on the camera unit 20 and/or on the illumination unit 34. These elements, grouped together in an assembly designated as inspection unit 40, can be mounted in a movable way on a guide mechanism, which is in the form of a rail system (not shown). The guide mechanism may have a drive mechanism by means of which the inspection units 40 and/or the included elements may be individually moved translationally and/or rotationally to allow alignment of the respective camera unit 20 and/or illumination unit 34 with respect to the inspection volume 24 and/or with respect to further inspection units 40.

As shown in FIG. 4, the inspection volume 24 is formed by four inspection units 40a, 40b, 40c, 40d, whereby in each case two inspection units 40a, 40c and 40b, 40d face each other, i.e. on opposite sides of the transport device 30. Thus, optical axes 42a, 42c and 42b, 42d of the respective camera units 20a, 20c and 20b, 20d lie substantially on one line. The total of four optical axes 42a, 42b, 42c, 42d intersect at a crossing point, or respectively crossing region, 44 within the inspection volume 24. However, it is also possible to provide an arrangement in which the individual optical axes 42a, 42b, 42c, 42d do not all meet in a single intersection point, but in a multiplicity of intersection points relatively close to one another. On each of the sides of the transport device 30, the optical axes 42a and 42b or respectively 42c and 42d of the inspection units 40a, 40b and 40c, 40d are at an angle to one another, preferably at an angle of about 90°. By means of this arrangement of the inspection units 40a, 40b, 40c, 40d, a container 10 located in the inspection volume 24 can be inspected in the transmitted light method as well as in the incident light method and in the dark field method. With the arrangement of the inspection units 40 side by side and parallel in transport direction 32, it is possible to record the entire side wall surface 26 of the container 10.

According to an embodiment of the invention, the camera unit 20 is configured as a line scan camera, whereby the length of a line sensor of the camera unit 20 is approximately adjustable to the length of the side wall surface 26 of the container 10. Line scan cameras have the advantage that they allow a very high image resolution in one imaging direction and at the same time a very high recording speed. To generate a high-resolution image of the entire side wall surface 26 of the container 10, the images taken by the camera units 20 are combined by a special image processing device.

In order to capture the most meaningful images possible of the container 10 under inspection, the device 100 includes illumination units 34, which may be, for example, static illumination means configured to optimally illuminate the entire inspection volume 24. In a preferred embodiment, each of the inspection units 40 includes an illumination unit 34 such that it is provided in an arrangement corresponding to a transmitted light configuration and an incident light configuration with respect to at least one of the camera units 20. In particular, each illumination unit 34 may be a conventional visible light source, an infrared light source, a UV source, a laser source or a combination thereof. Advantageously, the illumination unit 34 is adaptable to the specific optical testing to be performed on the container 10. Furthermore, the illumination unit 34, which is connectable to the camera units 20 of the inspection unit 40 directly or via a suitable means, can be moved along with the inspection unit 40 or can be moved individually in order to enable an optimal illumination of a container 10 to be imaged by the camera units 20. Further illumination means (not shown) can also be provided, which are each located essentially slightly laterally offset with respect to the axis between the camera units 20 and the container 10 to be tested and are used for the backlighting. Thus, when the camera unit 20a is switched on, the background illumination on the opposite side (i.e. between the container 10 and the camera unit 20c) can be used.

Thanks to these different lighting means, it is also possible to use a time multiplexing of different lighting types for one camera unit at a time. Thus, for example, a line with incident light and then a line with transmitted light can be recorded alternately and/or first a line with visible light, followed by a line with infrared illumination. A sequence of R-G-B recordings is also conceivable. In this way, multiple image types can be captured using a single camera unit.

Figure 5:
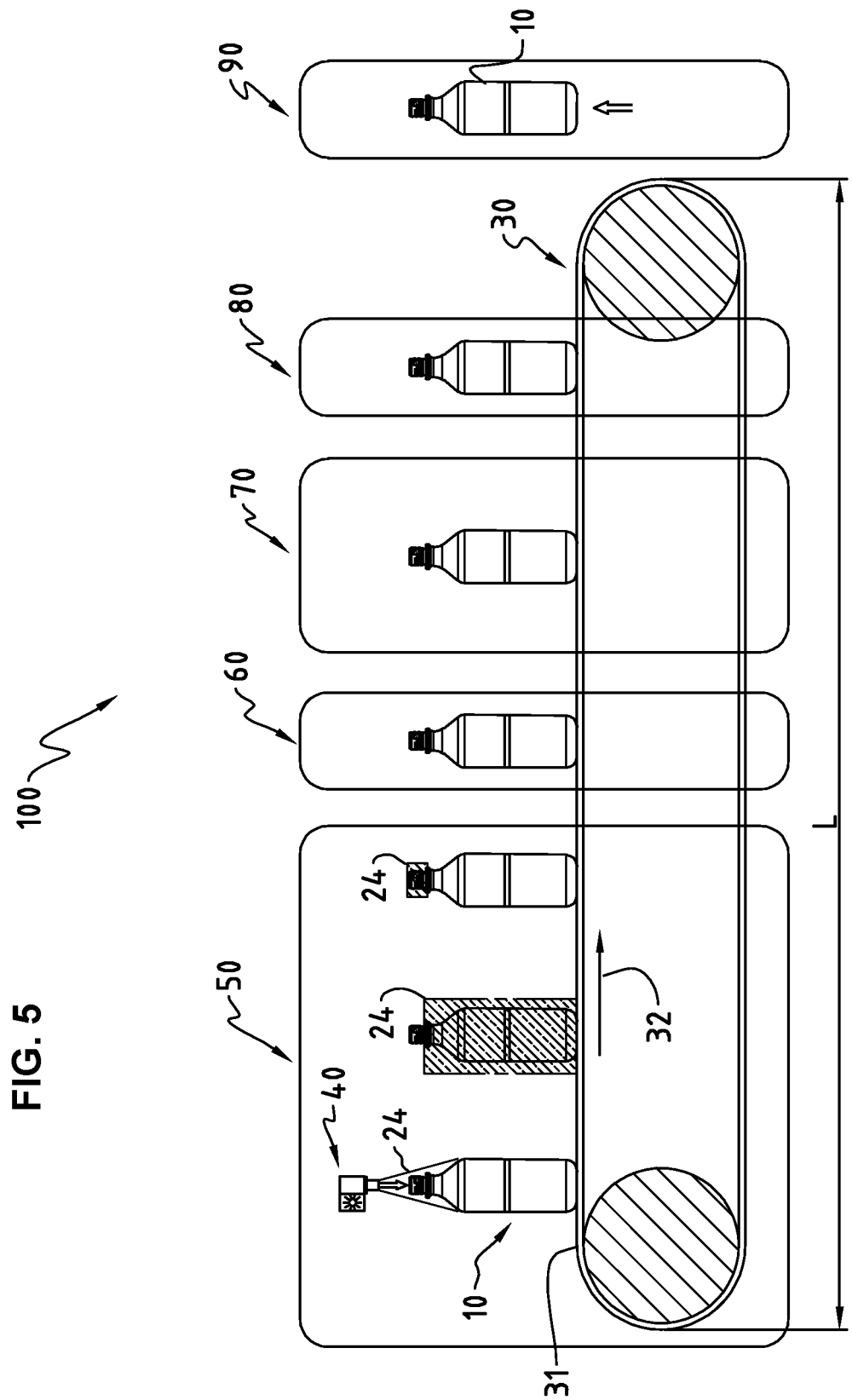
FIG. 5 shows schematically a lateral view of a second preferred embodiment of the present invention.

FIG. 5 shows a schematic top view of an embodiment of the device 100 according to the invention. Shown is the device 100 for the inspection of containers 10, which are conveyed along the transport direction 32 by means of a transport device 30 and thereby pass through a multiplicity of areas of the device 100, in which inspection volumes 24 are spanned by inspection units 40. The device 100 includes a multiplicity of areas, with area 50 already shown in FIG. 3. An area 60 of the device 100 is provided to inspect the container 10 or its contour for so-called slugs. For this purpose, illumination unit 34 and camera unit 20 are arranged opposite each other, so that the container 10 to be inspected is at least partially located in between. Through optical testing with backlighting, starting from the illumination unit 34, the contour and the slugs of the container 10 to be tested can be clearly distinguished from each other. Furthermore, shown in FIG. 5 is an area 70, which is provided to inspect the entire side wall surface 26 of the container 10 for any areas of thinness of the material. For this purpose, for example, a so-called dark field method can be used, whereby camera unit 20 and illumination unit 34 are matched to each other accordingly. Accordingly, the camera unit 20 is positioned relative to the illumination unit 34 in such a way that the light deflected by defects is detectable by the camera unit 20.

An area 80 of the device 100 is set up to inspect the container 10 by means of infrared radiation, whereby an infrared camera unit and a matched IR illumination unit are provided. By means of infrared radiation or an IR inspection unit used, changes in the adsorption or emission behavior in the case of inhomogeneity in the material of the container 10 can be detected and possibly, based on this, conclusions drawn about the manufacturing process and the tooling used for this.

In an area of the device 100 designated by 90, it is indicated in FIG. 5 that the bottom area 18 of the container 10 can also be subjected to an optical inspection. For this purpose, the container 10 can be lifted off the conveyor belt 31 by suitable means, e.g. gripping means, so that the bottom area 18 is accessible for an optical inspection by the corresponding inspection unit 40.

The invention claimed is:

1. Method for optical testing of hollow bodies, in which a hollow body is conveyed by means of a transport device at a transport speed, whereby an image of a side wall surface of the hollow body is generated by means of an inspection unit comprising at least one camera unit and at least one illumination unit,
   wherein a plurality of inspection units are arranged so that an inspection volume is able to be spanned, in which an image of the entire side wall surface of the hollow body as well as a bottom and a mouth region is independently generated by at least one of a transmitted light method, an incident light method, a dark field method, and combinations thereof,
   wherein the camera unit of the inspection unit is arranged to take a serial sequence of pictures in each time interval, which, at a given transport speed, represents a distance corresponding to a fraction of the size of the container,
   wherein the images of the hollow body and the serial sequence of pictures are evaluated to detect defects in the hollow body including at least one of contour, slugs, holes, pinholes, thin wall areas, thick wall areas, cracks, scratches, streaks, bubbles and non-melted areas.

2. Method according to claim 1, wherein four inspection units span a largely cuboid inspection volume, whereby optical axes of substantially diagonally opposite inspection units lie on a line or offset from one another.

3. Method according to claim 1, wherein the camera unit of an inspection unit is designed as a line scan camera, whereby the longitudinal axis of the line scan camera is aligned parallel to the longitudinal axis of the hollow body.

4. Method according to claim 1, wherein each inspection unit comprises an illumination unit for illumination of the hollow body, which is arranged to emit light in the form of a light strip parallel to the longitudinal axis of the hollow body.

5. Method according to claim 1, wherein the camera unit and the illumination unit of the inspection unit are positioned relative to one another and are able to be activated in such a way that the hollow body in the inspection volume is able to be inspected using the incident light method.

6. Method according to claim 1, wherein the camera unit and the illumination unit of opposite inspection units are positioned relative to one another and are able to be activated in such a way that the hollow body in the inspection volume is able to be inspected using the transmitted light method.

7. Method according to claim 1, wherein a filter element is arranged in the beam path of the light of an inspection unit, which is a polarizing filter.

8. Method according to claim 1, wherein the hollow body is inspected with further inspection units for inspecting a threaded area, the camera unit comprising telecentric optics and/or the illumination unit configured for telecentric illumination.

9. Method according to claim 1, wherein the hollow body is inspected by means of an infrared inspection unit.

10. Method according to claim 1, wherein four inspection units span a largely cuboid inspection volume, whereby optical axes of substantially diagonally opposite inspection units lie on a line or offset from one another in which the images of the entire side wall surface of the hollow body as well as the bottom and the mouth region are generated by a combination of the transmitted light method, the incident light method and the dark field method.

11. Method according to claim 1 wherein the hollow body is opaque.

12. Device for optically testing hollow bodies, comprising a transport device for conveying the hollow body, and at least one inspection unit, whereby the inspection unit comprises at least one camera unit and at least one illumination unit for imaging a side wall surface of the hollow body,
   wherein the device is configured in such a way that it comprises a plurality of inspection units, so that the entire side wall surface of the hollow body as well as a bottom and a mouth region are independently imaged by means of the inspection units in at least one of a transmitted light method, an incident light method, a dark field method, and combinations thereof,
   wherein the camera unit is a line scan camera, whereby a longitudinal axis of the line scan camera is aligned parallel to the longitudinal axis of the hollow body,
   wherein the images of the hollow body are evaluated to detect defects in the hollow body including at least one of contour, slugs, holes, pinholes, thin wall areas, thick wall areas, cracks, scratches, streaks, bubbles and non-melted areas.

13. Device according to claim 12, wherein each inspection unit comprises the camera unit, the illumination unit and at least one filter element, positioned and configured relative to one another in order to inspect the hollow body in the incident light method.

14. Device according to claim 12, wherein a plurality of inspection units are positioned and configured relative to one another so as to inspect the hollow body in the transmitted light method.

15. Device according to claim 12, wherein a width of the sensor of the line scan camera is at least equal to the length of the hollow body.

16. Device according to claim 12, wherein the illumination unit is arranged to emit light in the form of a light strip corresponding to a length of the hollow body parallel to the longitudinal axis of the hollow body.

17. Device according to claim 12, wherein a filter element is arranged in the beam path of the light emitted from the illumination unit, wherein the filter element is a polarizing filter.

18. Device according to claim 12, wherein one of the inspection units comprises a camera unit with telecentric optics and/or an illumination unit configured for telecentric illumination.

19. Device according to claim 18, wherein one of the further inspection units is configured as an infrared inspection unit for inspecting the hollow body by means of infrared radiation.

20. Device according to claim 12, wherein four inspection units span a largely cuboid inspection volume, whereby optical axes of substantially diagonally opposite inspection units lie on a line or offset from one another in which the images of the entire side wall surface of the hollow body as well as a bottom and a mouth region are generated by a combination of the transmitted light method, the incident light method and the dark field method.

21. Device according to claim 12 wherein the hollow body is opaque.

* * * * *